(12) United States Patent
Glaise et al.

(10) Patent No.: US 6,370,610 B1
(45) Date of Patent: Apr. 9, 2002

(54) APPARATUS FOR SWAPPING INPUT VALUES INTO CORRESPONDING OUTPUT VALUES

(75) Inventors: Rene J. Glaise, Nice; Francois Kermarec, Antibes; Eric Lallemand, La Gaude; Tan Pham, Antibes, all of (FR); Hans Rudolf Schindler, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/421,338

(22) Filed: Apr. 13, 1995

(30) Foreign Application Priority Data

Apr. 29, 1994 (EP) .............................................. 94480033

(51) Int. Cl.[7] ................................................ G06F 9/26
(52) U.S. Cl. ........................... 711/104; 711/5; 711/105; 711/170; 711/202; 711/206
(58) Field of Search ................................ 395/435, 415, 395/416, 417, 418; 370/16, 60; 364/200; 711/5, 104, 105, 170, 202–206

(56) References Cited

U.S. PATENT DOCUMENTS

| | | | | |
|---|---|---|---|---|
| 4,984,151 A | * | 1/1991 | Dujari | 364/200 |
| 5,119,369 A | * | 6/1992 | Tanabe et al. | 370/60 |
| 5,280,475 A | * | 1/1994 | Yanagi et al. | 370/60 |
| 5,303,233 A | | 4/1994 | Sugawara | 370/60 |
| 5,357,508 A | * | 10/1994 | Le Boudec et al. | 370/58.3 |
| 5,473,598 A | * | 12/1995 | Takatori et al. | 370/16 |

FOREIGN PATENT DOCUMENTS

| | | | |
|---|---|---|---|
| EP | 0182501 | 10/1985 | |
| EP | 0500238 | 2/1991 | |
| EP | 0 500 238 A1 | * 6/1992 | ........... H04L/12/56 |

OTHER PUBLICATIONS

"The concept of virtual paths and virtual channels in ATM–net", Digital Communications, 1990 International Zurich Seminar.*

"Connection management and rerouting in ATM networks", INFOCOM '94, 1994.*

Computer, vol. 10, No. 5, 5–77 pp. 68–74.

IEEE MICRO vol. 4, No. 2, 4–84 pp. 26–47.

* cited by examiner

*Primary Examiner*—Than Nguyen
(74) *Attorney, Agent, or Firm*—Joscelyn G. Cockburn

(57) ABSTRACT

The swapping function of input values to output values is performed through a pseudo content addressable memory which provides output values corresponding to a number E of n-bit input values, with $E=2^p-1$. The pseudo content addressable memory is made of a plurality of cascaded random address memories 20 having at least a $2^d$ addressing capability, with d higher than p. A control logic circuit is provided to store into each random access memory p-bits pointers, with each pointer being different from the others and randomly assigned to an input value. In order to find an output value corresponding to an input value, the control logic circuit sequentially address and reads the cascaded random access memories, the first memory being addressed with a part including a number n1 of bits of the input value, and each one of the next memories being addressed with the pointer read from the preceding memory concatenated with another part ni of bits of the input value, with ni equal to or lower than n–n1. The output value is found as a result of the addressing of the last memory.

10 Claims, 11 Drawing Sheets

APPARATUS FOR SWAPPING INPUT VALUES INTO CORRESPONDING OUTPUT VALUES

The present invention relates to an apparatus which permits input values to be swapped into output values and more particularly to such an apparatus which can be used in a communication system wherein the input values are the headers of data streams received by the system and the output values are the headers of the corresponding data streams transmitted by the communication system. Also, this apparatus can be used for implementing any table look-up function.

BACKGROUND ART

Most communication systems include switches and links and have for a function to transport the data streams received on input links to addressed output links.

The trend today is to use the so-called asynchronous transfer mode for high speed transmission and switching in future communication networks. In this mode, all data are transported in cells and each cell is 53-bytes long. The first five bytes contain a header including a 12-bit VP field (Virtual Path) and a 16-bits VC field (Virtual Channel) which comprise the address indicating the destination of the cell.

At the input of a switching node, the VP/VC fields are replaced by new ones (swapped) and a routing header is attached so that the cell can be routed through the switch. The routing header is then removed and the cell is transmitted on the proper outgoing link.

High speed swapping of the VP/VC fields is a difficult problem, since more then $2^{28}=268.10^6$ VP/VC combinations are possible and at a transmission rate of 155 Megabits/second, a cell must be processed in less than 2.5 microseconds.

Thus, processing all these combinations is not realistic. Practically a transport node is made of communication adapters attached to physical links on one side and to a switch on the other side. Each adapter must be able to recognize about 2000 VP/VC fields (entries) per physical link and thus if it is attached to 4 physical links it must be able to recognize about 8000 entries.

To perform this function, the communication adapter comprises a table, which is updated by a network manager as a function of the connections which can be established by the adapter.

Consequently, for the purpose of performing the VP/VC swapping function, an 8000-entry table which can be searched and updated within a cell interval has to be implemented in each communication adapter.

One conventional way of implementing such a table consists in providing a content addressable memory. Another way consists in implementing binary search algorithms or hashing techniques.

A first drawback of these implementations is that the search operation takes the major part of the cell processing time. A second drawback results from the fact that a new entry in the table must be made at the right place and thus the table updating is not easy.

Examples of search algorithms are described in the article IEEE Proceedings Vol. 135 No. 1, January 1988.

SUMMARY OF THE INVENTION

An object of the subject invention is to provide an apparatus for swapping input values into output values which performs its swapping function in a very short time less than 2 microseconds, by using low-cost memories.

Another object of the subject invention is to provide such an apparatus wherein the memories can be easily updated to change the input values which can be swapped.

According to the present invention, the swapping function is performed through cascaded look-up tables coupled through a path whose width depends upon the number of entries permitted in the equivalent content addressable memory. Pointers have to be set and updated into the tables so that searching paths are unambiguously marked for all possible entries.

The swapping function is thus performed through a pseudo content addressable memory which provide output values corresponding to a number E of n-bit input values, with $E=2^p-1$.

The pseudo content addressable memory is made of a plurality of cascaded random address memories having at least a $2^d$ addressing capability, with d higher than p.

A control logic circuit is provided to store into each random access memory p-bits pointers, with each pointer being different from the others and randomly assigned to an input value. In order to find an output value corresponding to an input value, the control logic circuit sequentially address and reads the random access memories, the first memory being addressed with a part including a number n1 of bits of the input value, and each one of the next memories being addressed with the pointer read from the preceding memory concatenated with a part ni of bits of the input value, with ni equal to or lower than n–p. The output value is found as a result of the addressing of the last memory.

DESCRIPTION OF THE INVENTION

Figure 1:
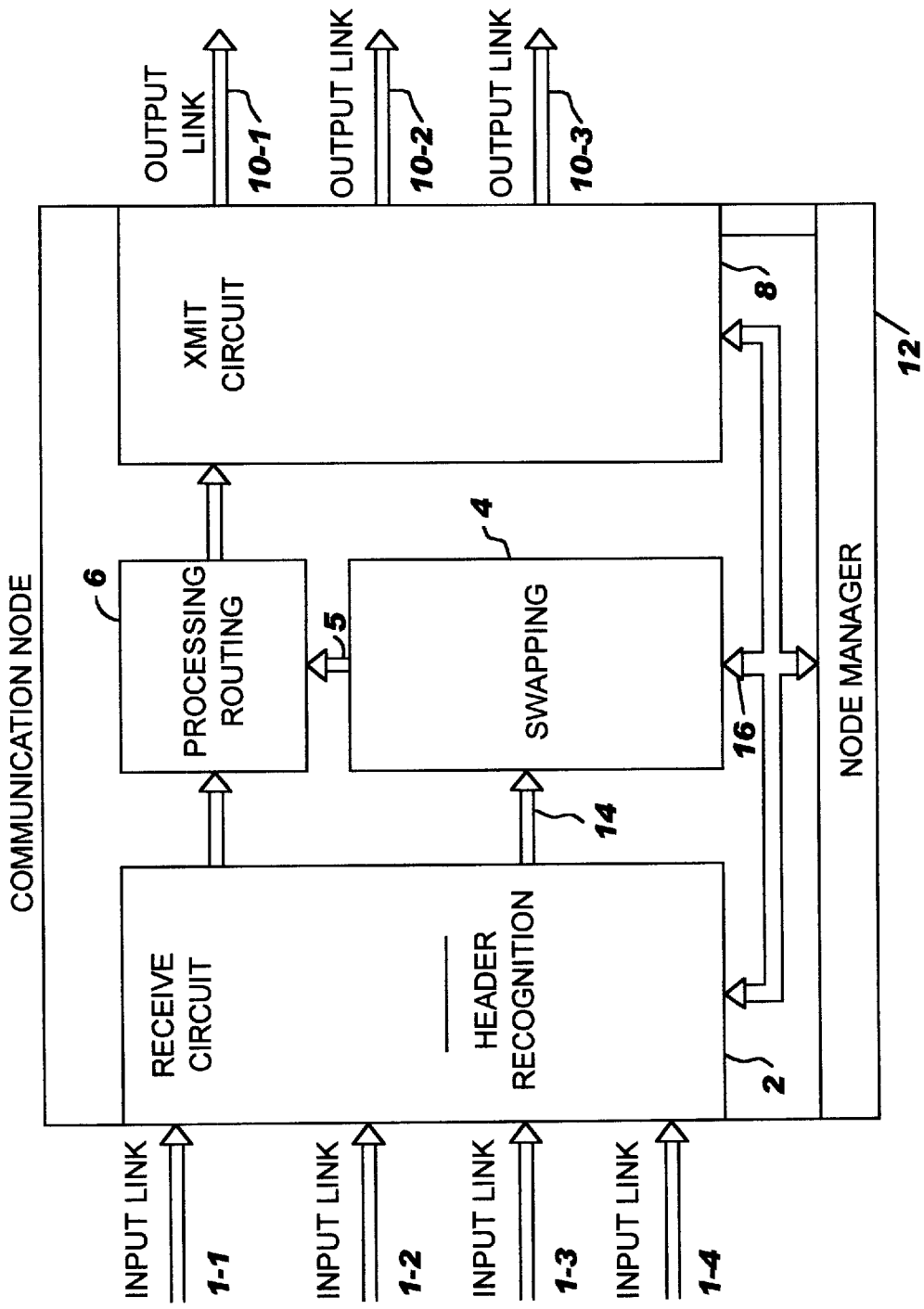
FIG. 1 schematically represents a communication node wherein the present invention may be implemented.

FIG. 1 schematically represents the receive side of a communication node wherein the circuit performing the swapping function of input values into output values can be used.

Obviously, such a circuit can be used in any other environment.

As shown in FIG. 1, input links 1-1 to 1-4 are connected to a receive circuit 2 which processes the bit streams received from the input links.

In the preferred application of the subject invention, the bit streams are arranged in cells in accordance with the so-called asynchronous transfer mode ATM.

One of the function of the receive circuit 2 is to detect the headers of the cells, which are provided to a swapping circuit 4. The swapping circuit 4 changes the VP/VC fields contained in the headers into the new VP/VC fields to be inserted into the cells to be transmitted by the node.

The cells are processed and routed through circuit 6 and are transmitted with the new headers through circuit 8 on a node output link 10-1 to 10-3, with the new headers provided by circuit 4 through bus 5.

The node comprise a node manager 12, one function of which is to control the swapping circuit 4.

The swapping circuit 4 is made of a pseudo-content addressable memory arrangement which operates as a x-entry table to provide the VP/VC output values which correspond to the VP/VC input values, within a cell processing time.

In a preferred embodiment of the invention, the input values provided through bus 14 from receive circuit 2 include the 28-bit VP/VC field of an ATM cell and five additional bits which contain additional information such as the input link physical address, and control information indicating how the cell is to be processed.

Figure 2:
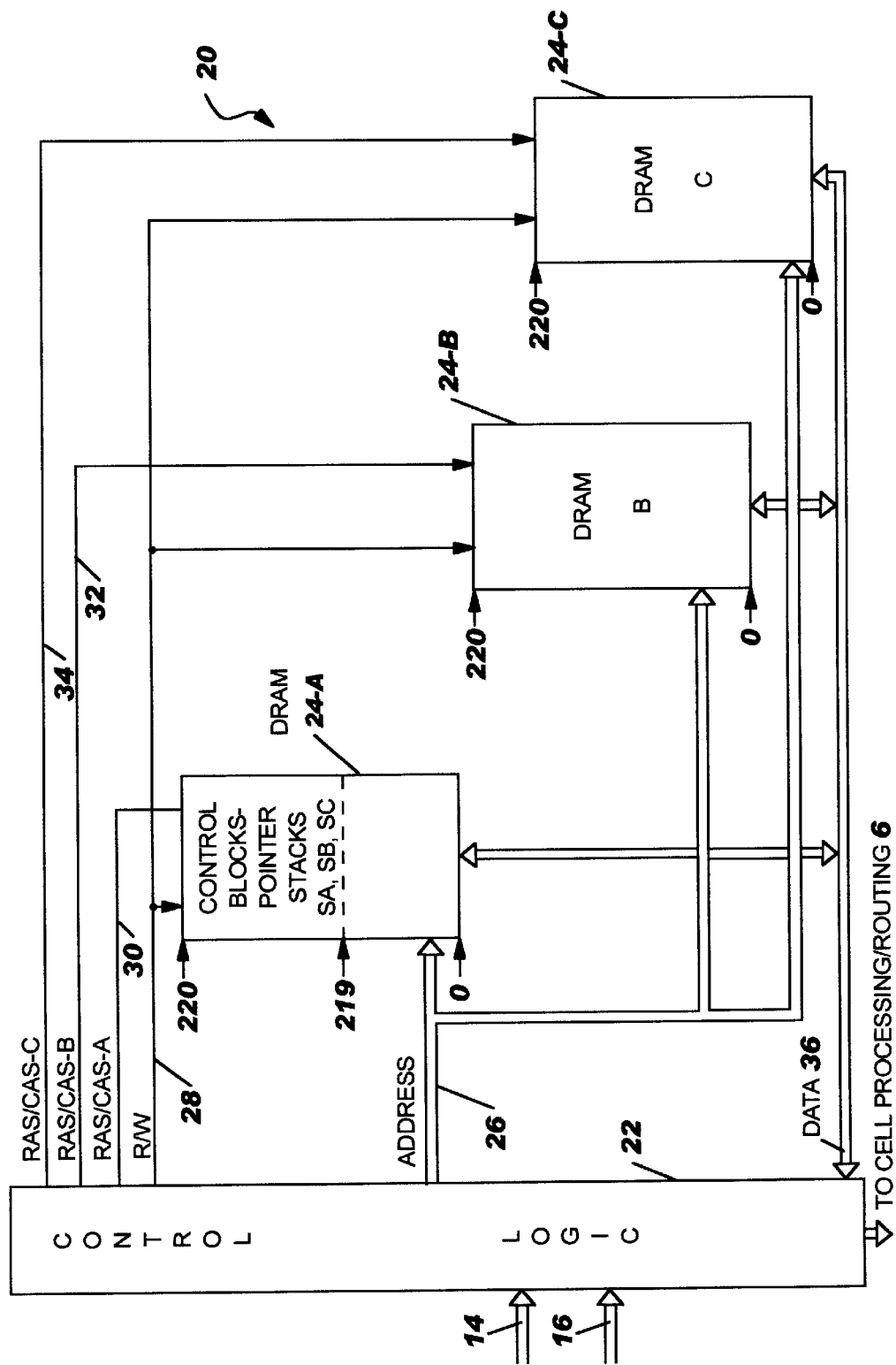
FIG. 2 represents the swapping circuit including the cascaded dynamic random access memories.

The swapping circuit 4 is shown in FIG. 2. It is made of a memory arrangement 20 and of a control logic 22 operating as a pseudo content addressable memory.

Assuming that the input values include 33 bits, as explained above, and that a $2^{13}$ entry table is required, the memory arrangement comprises three random access memories 24-A, 24-B and 24-C.

The largest Random Access Memory RAM readily available today is a 16 Megabits dynamic RAM, DRAM. Various organizations are possible. Most of the suppliers of such DRAM devices are delivering devices arranged in 1 Megabit×16 configuration which are very convenient for the subject application. All recent DRAM implements a CAS (Column Address Selection) before RAS (Row Address Selection) feature, that permits a straight forward refreshing of the device. The refresh operation of the DRAM needs only a timer and since there is only a memory interrogation per received cell, there is enough time left between two cells for performing the refreshing operation of the memories without any interference with the normal operation. At 155 Megabits/second, a cell may be received every 2,7 microseconds.

As will be described later, 4 RAM accesses (150 Nanoseconds each) are necessary to perform the swapping function, less than 10% of the cell processing time is necessary to interrogate the memory.

The dynamic random access memories 24-A, 24,B and 24-C are coupled through a path whose width corresponds to the depth or number of entries permitted in the equivalent content addressable memory. Thus, assuming that searches on 33 bits are needed, with $E=2^{13}-1=8191$ possible entries, control logic 22 sequentially address memory 24-A, 24-B and 24-C by activating the memory control lines: Read/write 28, RAS/CAS 30, 32, and 34. R/W line 28 is common to the three memories, and there are two RAS/CAS lines for each memory represented as lines 30, 32 and 34.

First, memory 24-A is addressed through control logic 22 which provides on address bus 26 a first part comprising n1 bits of the input values. 13 bits of the data read from memory 24-A are provided through data bus 36 to control logic 22, which then address memory 24-B with a second part (different from the first part) comprising a ni=n2 of bits of the input values plus the 13 bits read from 24-A. 13 bits of the data read from memory 24-B are provided through data bus 36 to control logic 22, which then address memory 24-C with a third part (different from the first and second parts) comprising ni=n3 bits of the input values plus the 13 bits read from bus 24-B.

The 13-bits data read from memory 24-C are used to address a control block part reserved in one of the memory for example 24-A, which contains the VP/VC output value corresponding to the VP/VC input value used to sequentially address the memories 24-A, 24-B and 24-C.

Obviously, depending upon the addressing capability of the DRAM, of the number of entries and of the number of bits of the input values, a different number of DRAM may be needed. It will be obvious for the man skilled in the art to cascade the number of DRAM which are necessary to each specific application.

In the preferred embodiment of the invention, wherein the swapping function may be performed by using three DRAM, assuming that:

the input value is n- bits wide, a content addressable memory with $E=2^p-1$ entries is needed, each memory has an addressing capability of $2^d$, with d higher than p, n1, n2, n3 are chosen in such a way that:

n1+n2+n3=n, which is the number of bits of the input values on which the search must be performed, n1 is lower or equal to d, n2+p and n3+p are lower or equal to d Assuming d=20 and p=13, in the preferred embodiment of the invention memory 24-A is addressed with n1=19 bits of the input value, memory 24-B is addressed with n2=7 bits of the input value plus the 13 bits read from memory 24-B and memory 24-C is addressed with n3=7 bits plus 13 bits read from memory 24-B.

Since each memory has a $2^{20}$ addressing capability, only one half of memory 24-A is used for performing a search operation, thus the other one half part may be used for storing the control blocks and pointer stacks, which are necessary for updating the memory contents, as it will be described hereafter.

Pointers have to be stored and updated in the three memories 24-A, 24-B and 24-C so that searching paths are marked unambiguously for the entries made in the pseudo content addressable arrangement 20.

To this purpose, three stacks SA, SB and SC of $2^{13}-1$ different pointers are assigned to each memory 24-A, 24-B and 24-C in memory 24-A.

Adding new entries while the pseudo content addressable memory is not full, is done by picking up new unique pointers from the pointer stacks. If the new path marked is totally different form all others a new pointer is pulled of each stack, thus depleting each of them by one.

If the new entry has something in common with a previous one, the corresponding table must not be updated in order to break a previously established path. Thus, each time a new entry is done in the pseudo content addressable memory, a search must be made to determine whether the path is already marked. If one of the DRAM A, B or C returns something different from "all zero", (which is indicative of an empty location,) the contents must not be altered and no pointer is removed from the corresponding stack.

The last DRAM 24-C is always updated unless the new path is a complete duplication of a previous entry. In that case, depending upon the specific application, the swap table can be overridden with a possible new value or flagged as an error to the user.

Whenever an entry must be deleted from the pseudo content addressable memory, it must be checked to make sure that the corresponding entry is actually in it. During the checking process the pointers returned as a result of the reading of memory A, B and C must be collected.

The pointer read from C is always removed and put back on the top of the stack SC so that it may re-used immediately.

The pointer read from B must not be removed if it is used by more than one path. This must be checked.

Finally, a pointer read from A has to be checked for multiple uses in memory B, in a similar fashion.

These operations will be described in reference to FIGS. 4 to 8.

Figure 3:
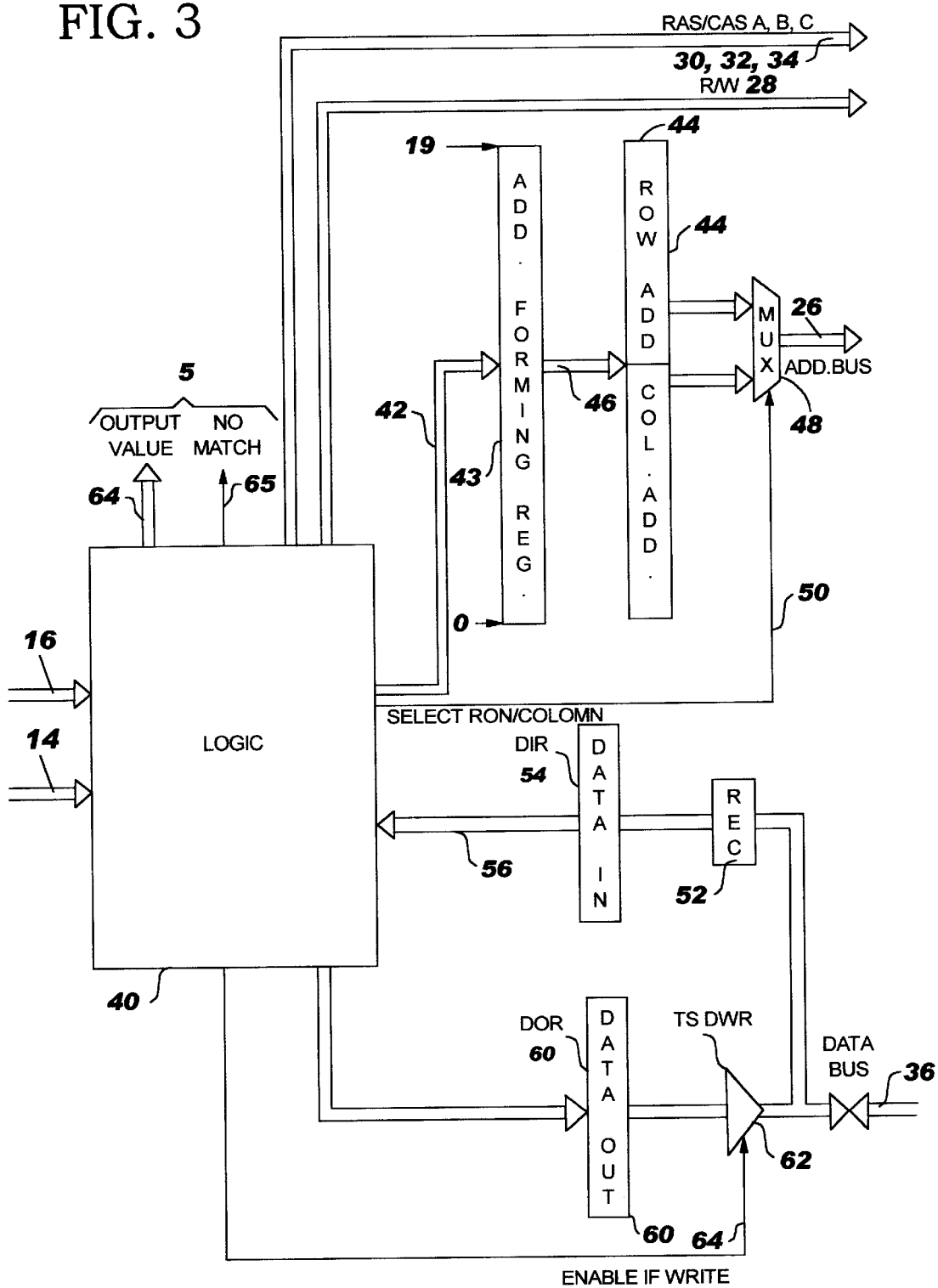
FIG. 3 represents the control logic which controls the memory operations which are needed to implement the swapping function.

The control logic 22 is shown in FIG. 3, it comprises a logic circuit 40 which receives from receive circuit 2 the input values to be changed through bus 14 and from node manager 12 control data through bus 16.

Logic 40 generates the memory control signals on RAS/CAS lines and R/W line 30, 32, 34 and 28, which are necessary to perform the resetting, updating, searching and deleting operations of the pseudo content addressable memory 20. Also it provides the address bits on bus 42 to an address forming register 43 in which the address bits are arranged as it will be described later on. In the preferred embodiment of the present invention the DRAM A, B, and C are provided with a row and column addressing capability so that the address bits taken from address bit forming register 43 are separated into a 12-bit row address and 8-bit column address which are provided into row address register 44 and column address register 46 to be applied through multiplexer 48 onto address bus 26 under control of select row/ column signals generated by circuit 40 on line 50.

The data bus is provided to receiving circuits 52 in order the bits received from this bus are inputted into Data In Register 54. The received bits stored in register 54 are provided to the logic circuit 40 through bus 56. The data to be written into a selected DRAM A, B or C are provided by circuit 40 into Data Out Register 60 to be written into the addressed location through drivers 62 which are activated through an ENABLE if WRITE signal on line 64 generated by circuit 40.

Figure 4:
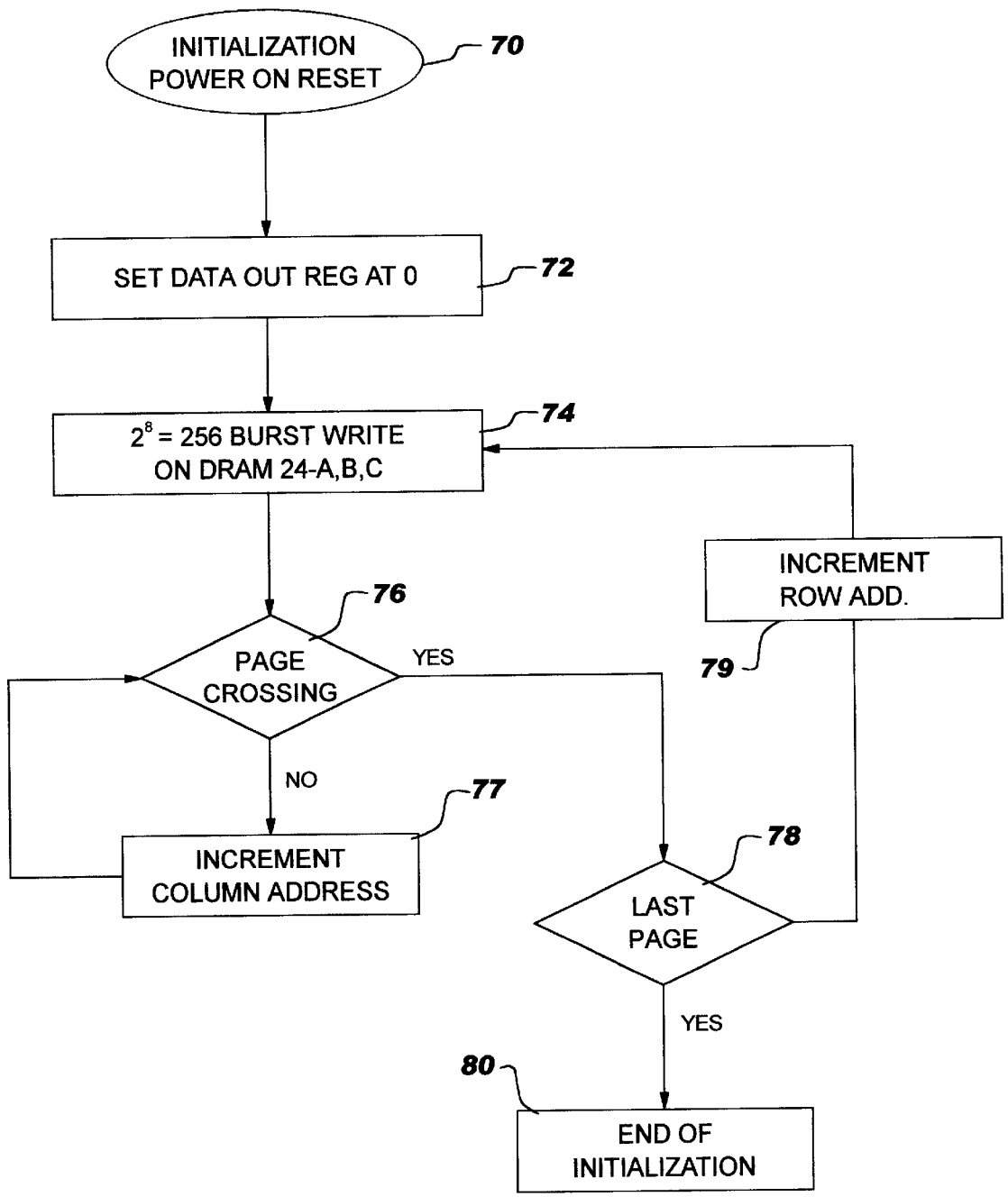
FIG. 4 represents the operations which are performed by the control logic to initialize the memory contents.

It will now be described in reference to FIG. 4, how the pseudo content addressable memory is initialized at each power on reset operation initiated from the node manager 12.

When a power on reset command is detected on bus 16, as shown at step 70, circuit 40 set data out register 60 to all 0. The three DRAM A, B and C are cleared in parallel by scanning the $2^{20}$ addresses and writing each addressed location with "all 0".

This is done by performing $2^8$ consecutive write operations in page mode in parallel in DRAM A, B and C as shown at step 74, by activating RAS/CAS and R/W lines.

At each write operation, it is tested if a page boundary is crossed, step 76, if no, the column address is incremented by 1 at step 77 to continue the burst write operation. At each page crossing it is tested whether this is the last page crossing at step 78, if NO the row address is incremented at step 79 and then the RAS/CAS lines are activated to perform a new $2^8$ burst write on DRAM A, B, C. If YES, the initialization operation is completed as shown at 80.

Then, the pointer stacks SA, SB and SC have to be prepared in upper part of DRAM 24-A.

Figure 5:
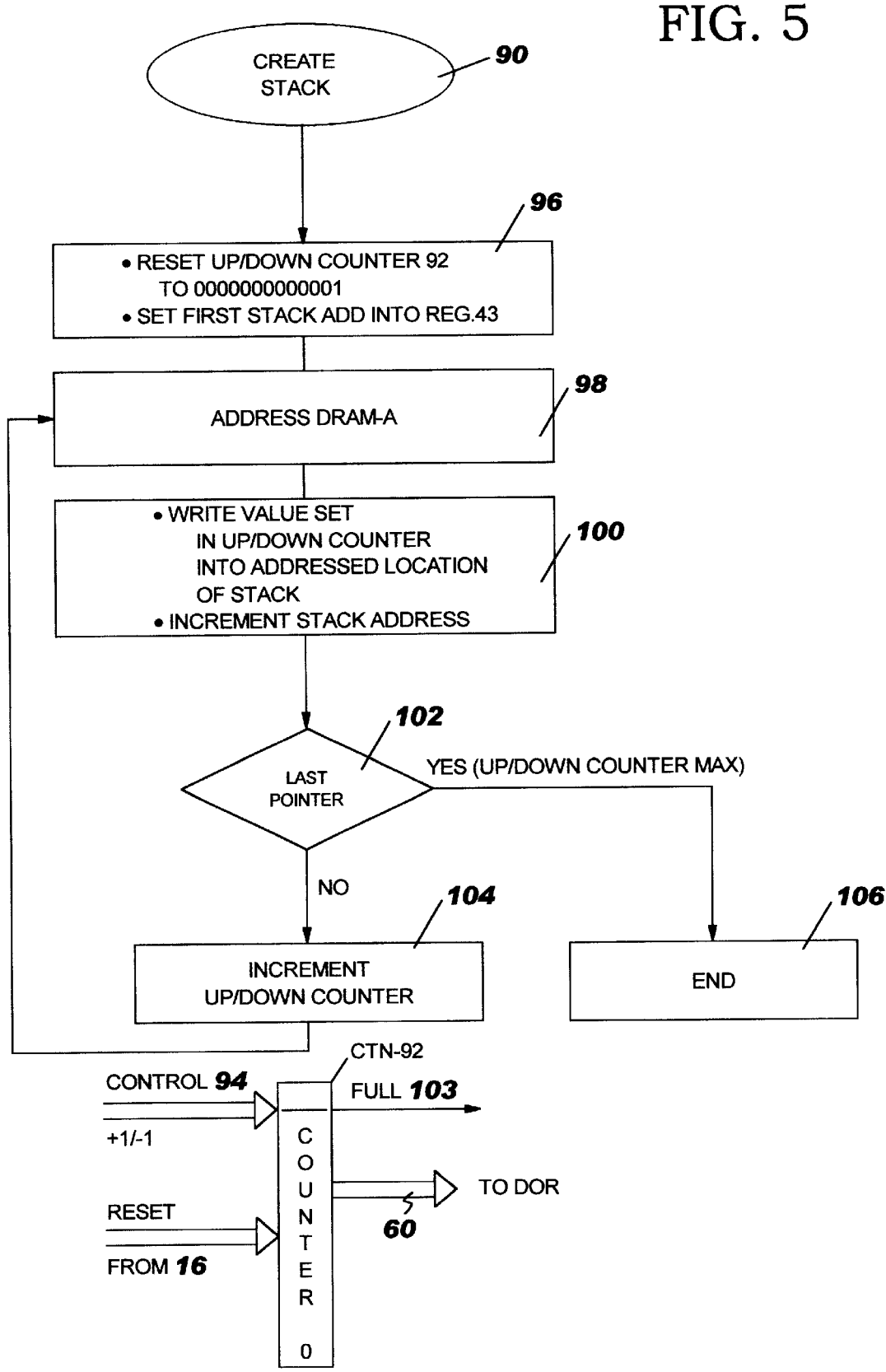
FIG. 5 represents the operations which are performed by the control logic to create the pointer stacks.

The same process as shown in FIG. 5 is performed for each stack SA, SB and SC. For each stack, the node manager issues a CREATE STACK command on bus 16, which is decoded by circuit 40 as shown at step 90. This operation may be part of the initialization operation. In circuit 40, three 13-bit UP/DOWN counters are provided in order to perform this function with one counter CTN-92 shown in FIG. 5 assigned to each stack. Circuit 40 generates control signals on control bus 94 to increment/decrement the counter CTN-92 in order to perform the operations described in reference to FIGS. 5, 6, 7 and 8.

Initially, as shown at step 96 the counter 92 is reset to the first pointer value for example "000000000000" and the first stack address is loaded into register 43.

Then at step 98, DRAM-A is addressed. At step 100, the value set in up/down counter 92 is written into addressed location of the stack and the stack address in register 43 is incremented by 1.

At step 102, the up/down counter value is tested to determine whether it has reached the last pointer value: 1111111111111, as indicated by a 1 in the upper most position on FULL line 103. If no, the up/down counter is incremented by 1 at step 104 and the process is resumed at step 98.

If yes, the process is ended as shown at 106.

It will now be described in reference to FIGS. 6, comprising FIGS. 6-A, 6-B and 6-C, how the DRAM 24-A, B and C are updated, to be able to mark the paths corresponding to all possible entries.

This is done through the node manager 12 which issues a command on bus 16, "UPDATE for ENTRY "xxx", with xxx is a 33-bit input value, as shown at 120.

At step 122, the value of up/down counters 92 associated to the stack C is tested to determine if on DRAM-C is full. If yes, which means that no new value may be added, an error or warning is reported. If no, the 19 Most Significant Bits MSB of the entry "xxx" are set into the position 0 to 18 of the 20-bit address forming register 43 and a 0 is set into the position 19 of said register, to address the lower part of DRAM 24-A and read the value stored at this address as shown at step 124. The address value is saved.

Then, it is tested at step 126, if the read value is "all zero". If no, which means that an entry comprising the same 19-MSB bits already exists, the current pointer read at step 124 is loaded into address forming register 43 as shown at step 128.

If yes, a new pointer is fetched from Stack A, by addressing the location at the top of stack SA and reading the pointer "PA", as shown at step 130. Then, as shown at step 132 the up/down counter 92 associated to stack SA named 92-A is decremented and at step 134 the fetched pointer PA is written into DRAM 24-A at the address saved at step 124, and PA is loaded into positions 19 to 7 of address forming register 43.

Figure 6A:
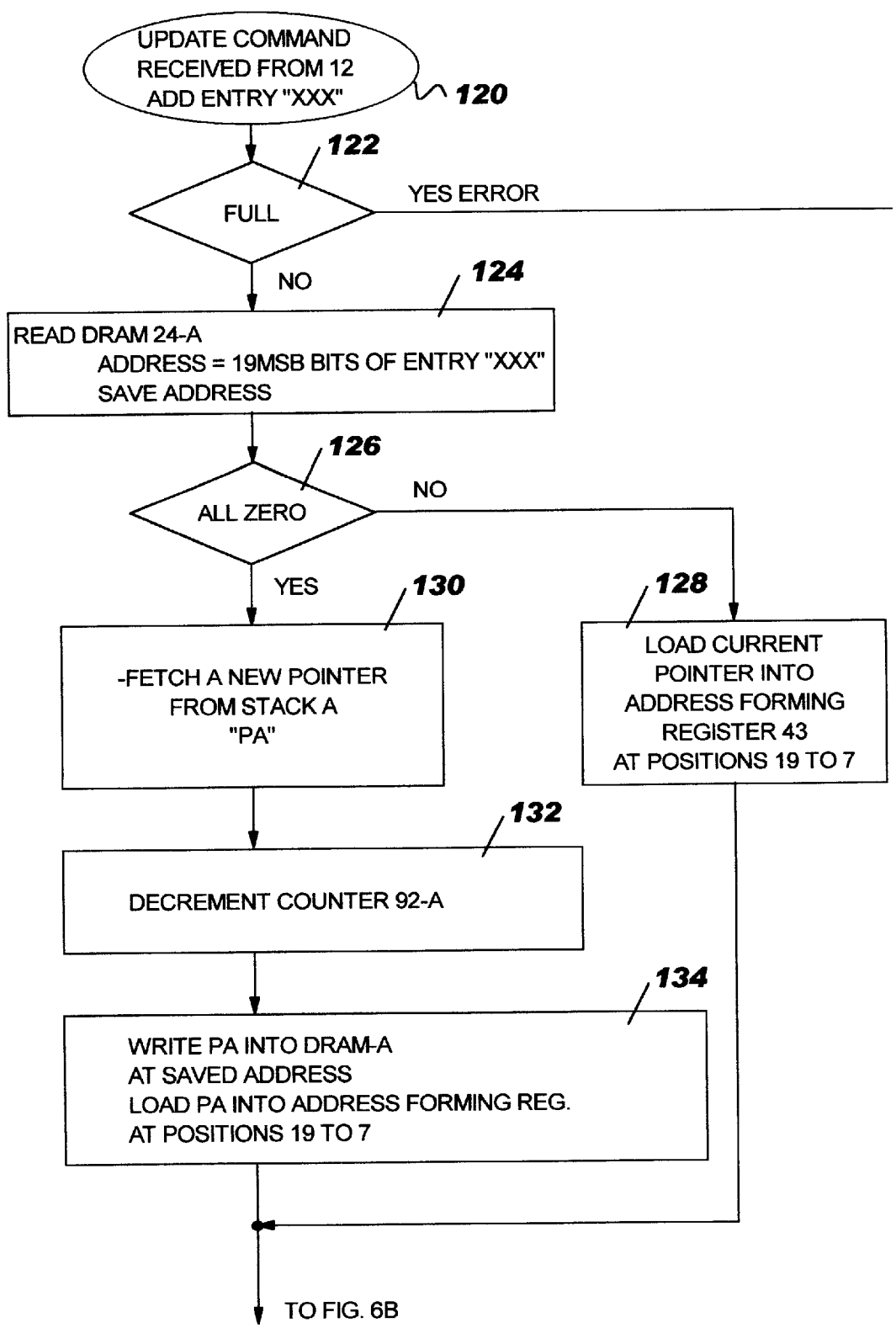
FIGS. 6-A, 6-B and 6-C represent the operations which are performed by the control logic to update the memory contents for a new entry.
Figure 6B:
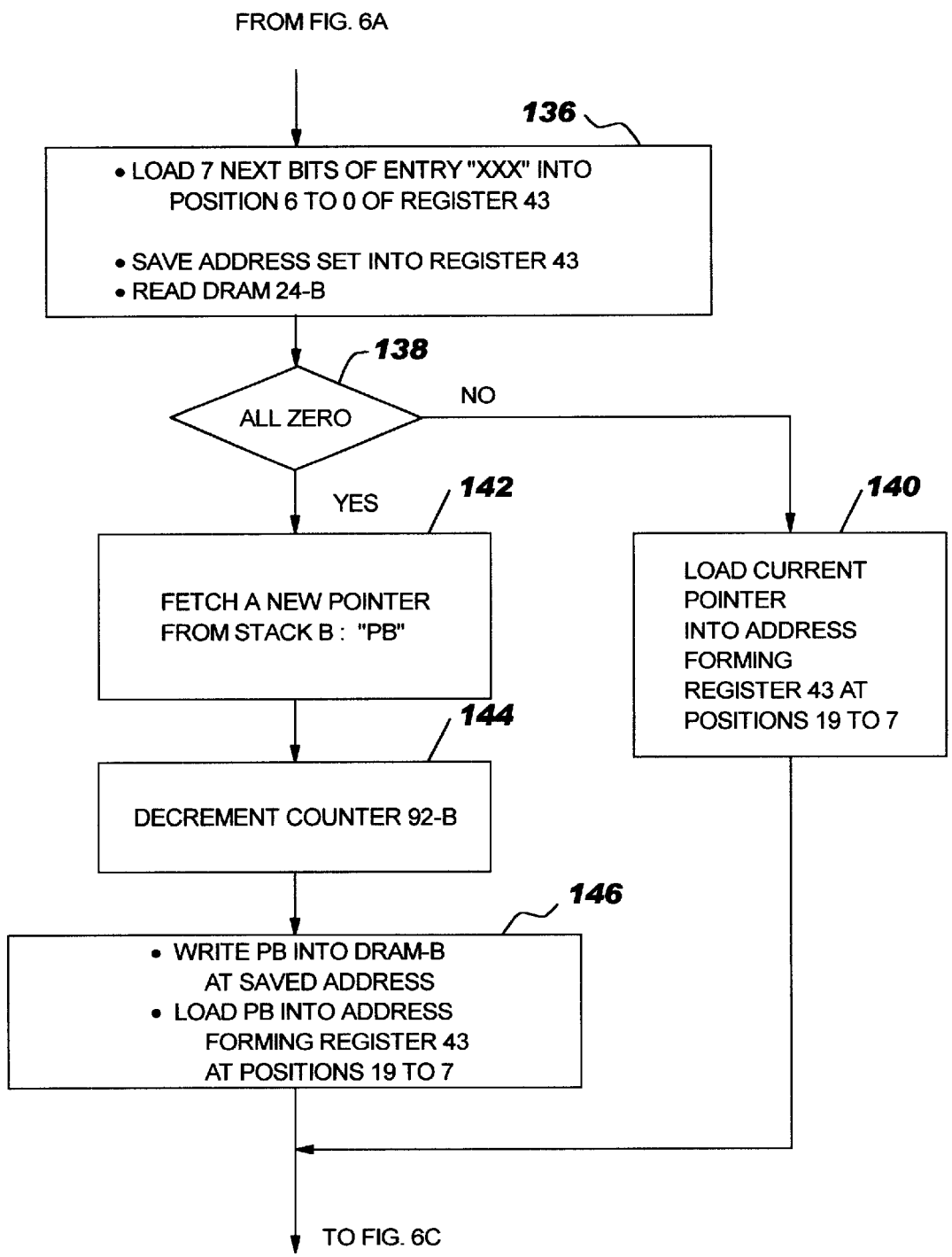
Figure 6C:
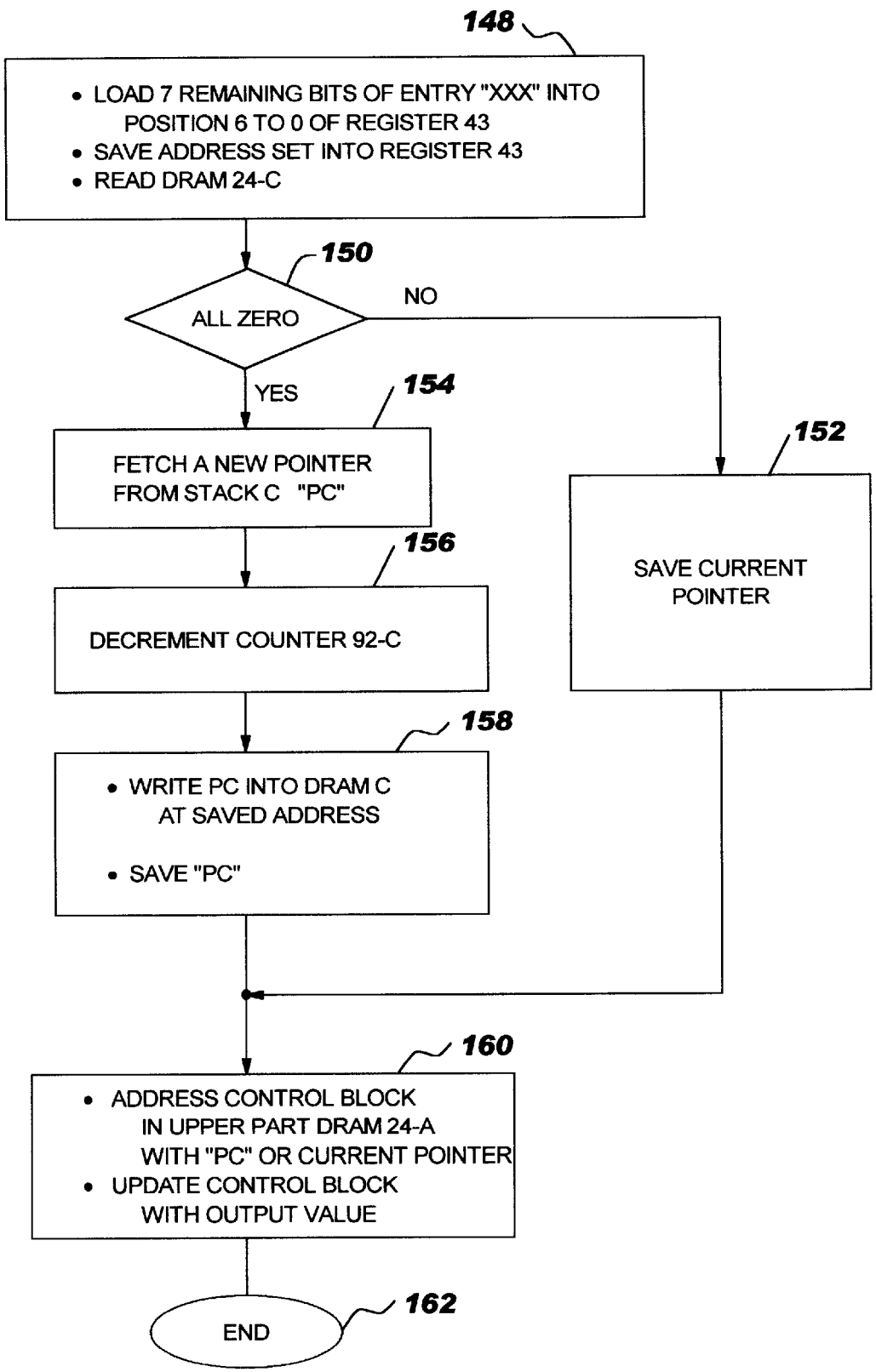

The process continues as shown in FIG. 6-B, by first loading the 7 next bits of entry "xxx" into positions 6 to 0 of register 43. The address so set into register 43 is saved and the DRAM 24-B is read, step 136.

Then, it is tested at step 138, if the read value is "all zero". If no, which means that an entry comprising the same 7 bits already exists, the current pointer read at step 136 is loaded into the address forming register 43 as shown at step 140.

If yes, a new pointer is fetched from Stack B, by addressing the location at the top of stack SB and reading the pointer "PB", as shown at step 142. Then, as shown at step 144 the up/down counter 92 associated to stack SB named 92-B is decremented and at step 144, the fetched pointer PB is written into DRAM 24-B at the address saved at step 136, and PB is loaded into positions 19 to 7 of address forming register 43.

The process continues as shown in FIG. 6-C, by first loading the 7 remaining bits of entry "xxx" into positions 6 to 0 of register 43. The address so set into-register 43 is saved and the DRAM 24-C is read, step 148.

Then, it is tested at step 150, if the read value is "all zero". If no, which means that an entry comprising the same 7 bits already exists, the current pointer read at step 148 is saved as shown at step 152. A warning signal may be sent to the node manager to indicate that a path already marked, in being updated.

If yes, a new pointer is fetched from Stack C, by addressing the location at the top of stack SC and reading the pointer "PC", as shown at step 154. Then, as shown at step 156 the up/down counter 92 associated to stack SC named 92-C is decremented and at step 158, the fetched pointer PC is written into DRAM 24-C at the address saved at step 148, and PC is saved.

Then, a control block having an address depending upon PC, in upper part of DRAM 24-A is addressed and the output value corresponding to the entry "xxx" is written into this control block as shown at step 160.

The updating process is ended as shown at 162.

It will now be described in reference to FIG. 7, the operations which are performed by control logic 40 to search the output value corresponding to a received 33-bit input value.

These operations are started when a header comprising the 33-bit input value is provided on bus 14 as shown at 170.

The 19 MSB bits of the input value is loaded into positions 0 to 18 of address forming register 43 and the position 19 of said register is set to 0. The DRAM 24-A is addressed and read and a pointer PA is returned to logic circuit 40 through register 54, as shown at step 172.

The PA pointer value is tested at step 174. If it is found equal to all zero, a NO MATCH signal is returned on line 65 to the processing/ routing circuit 6.

If it found different from all zero, the pointer PA is loaded into positions 19 to 7 of address forming register 43, and the 7 next bits of the input value are loaded into positions 6 to 0, at step 176.

Then, DRAM 24-B is read at step 178 and the pointer PB returned to circuit 40 through register 54 is tested at step 180. If it is found equal to all zero, a NO MATCH signal is returned on line 65.

If it is found different from all zero, the 13-bit pointer PB is loaded into positions 19 to 7 of register 43 and the 7 remaining bits of the input value are loaded into positions 6 to 0 of register 43. DRAM 24-C is read and and a pointer PC is returned to logic 40, as shown at step 184.

The value of the pointer PC is tested at step 186. If it is found equal to all zero, a NO MATCH signal is returned on line 65.

If it is found different from all zero, indicative of a MATCH the pointer value is used to address a control block in the upper part of DRAM-A and the control block which contains the output value is read and provided on output bus 64, to the processing/routing circuit 6.

Figure 8A:
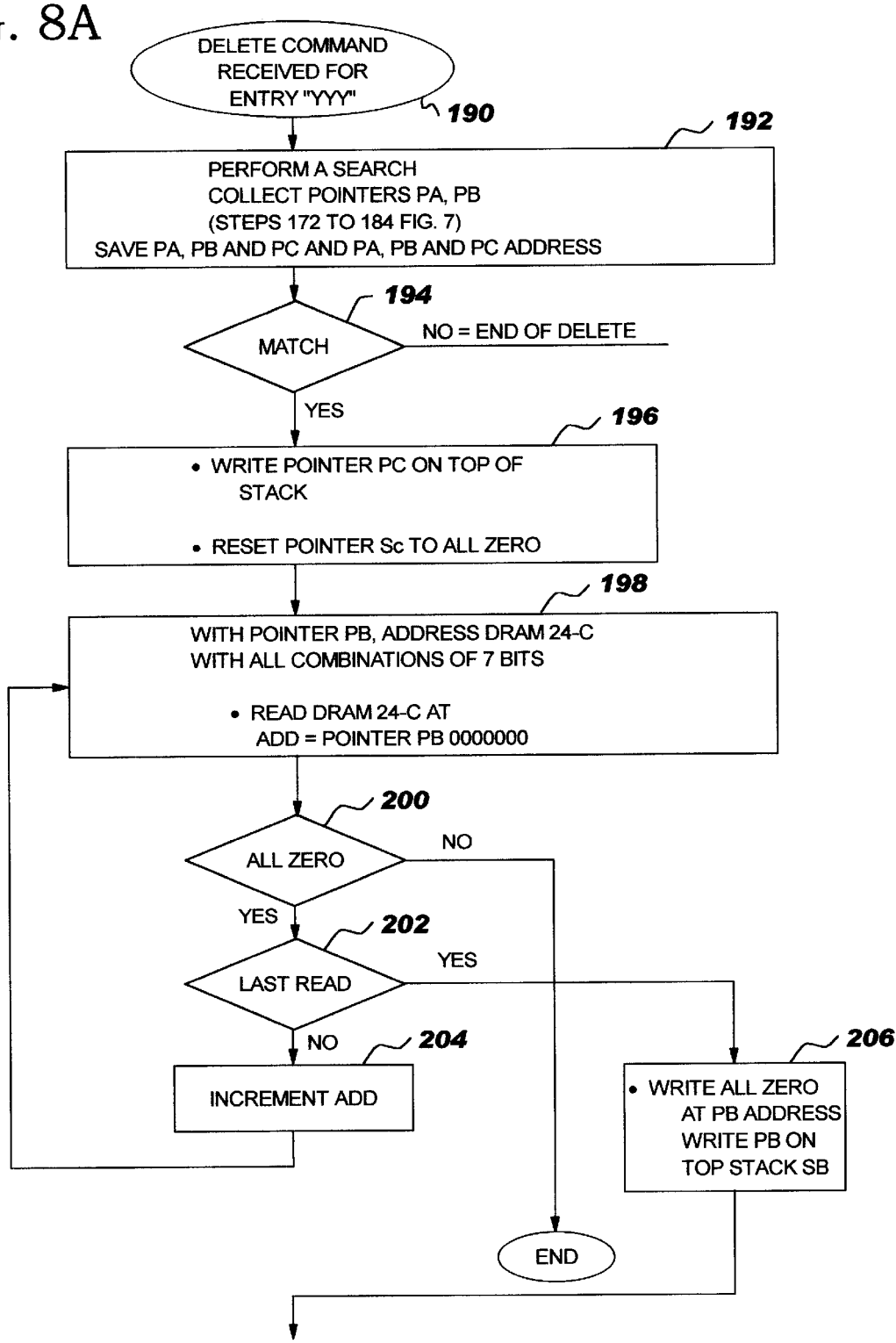
FIGS. 8-A and 8-B represent the operations which are performed by the control logic to delete one entry.
Figure 8B:
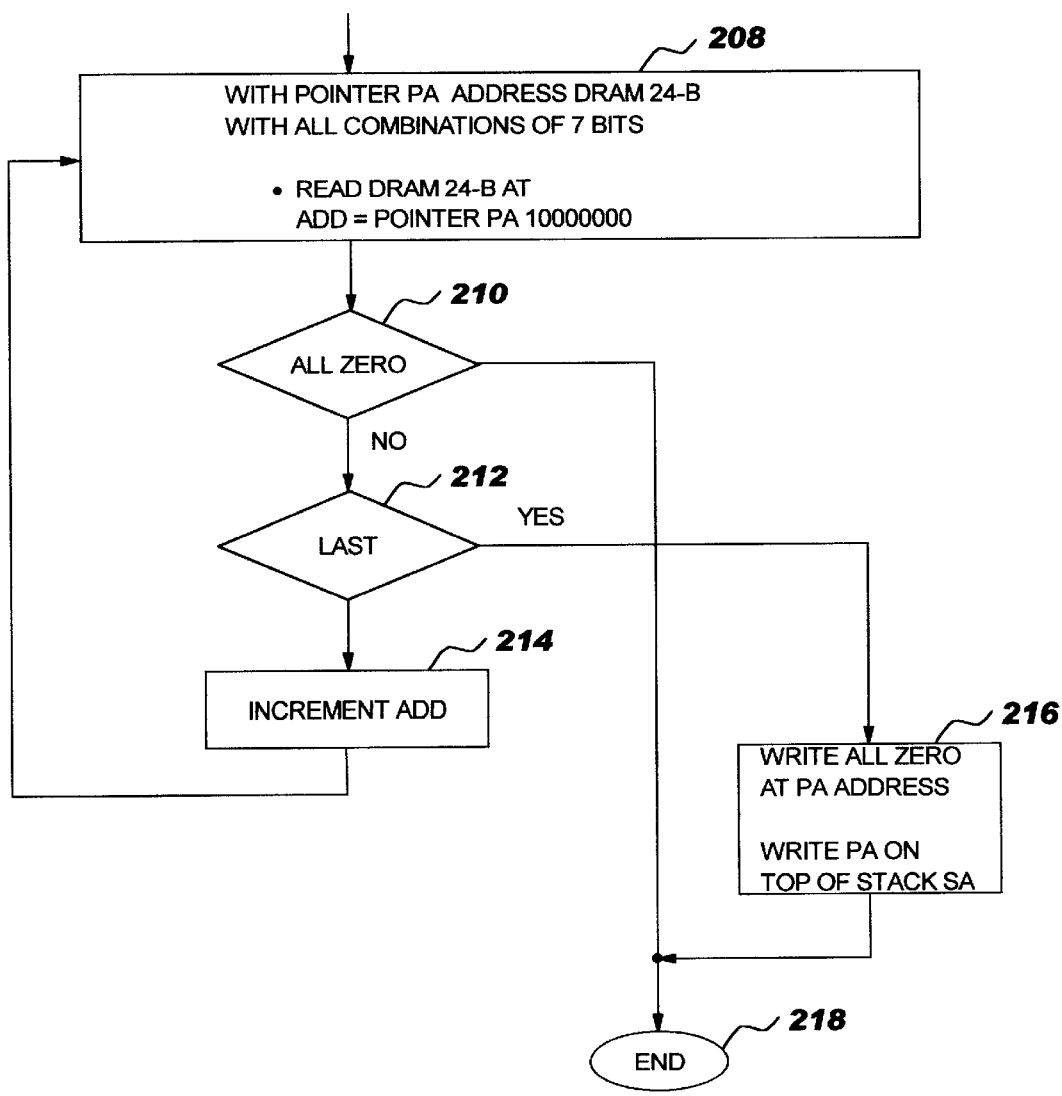

It will now be described in reference to FIGS. 8-A and 8-B, how an entry "yyy" may be deleted.

The operations are started by the receiving of a DELETE COMMAND for ENTRY "yyy" received on bus 16 from node manager 12, as shown at 190.

Figure 7:
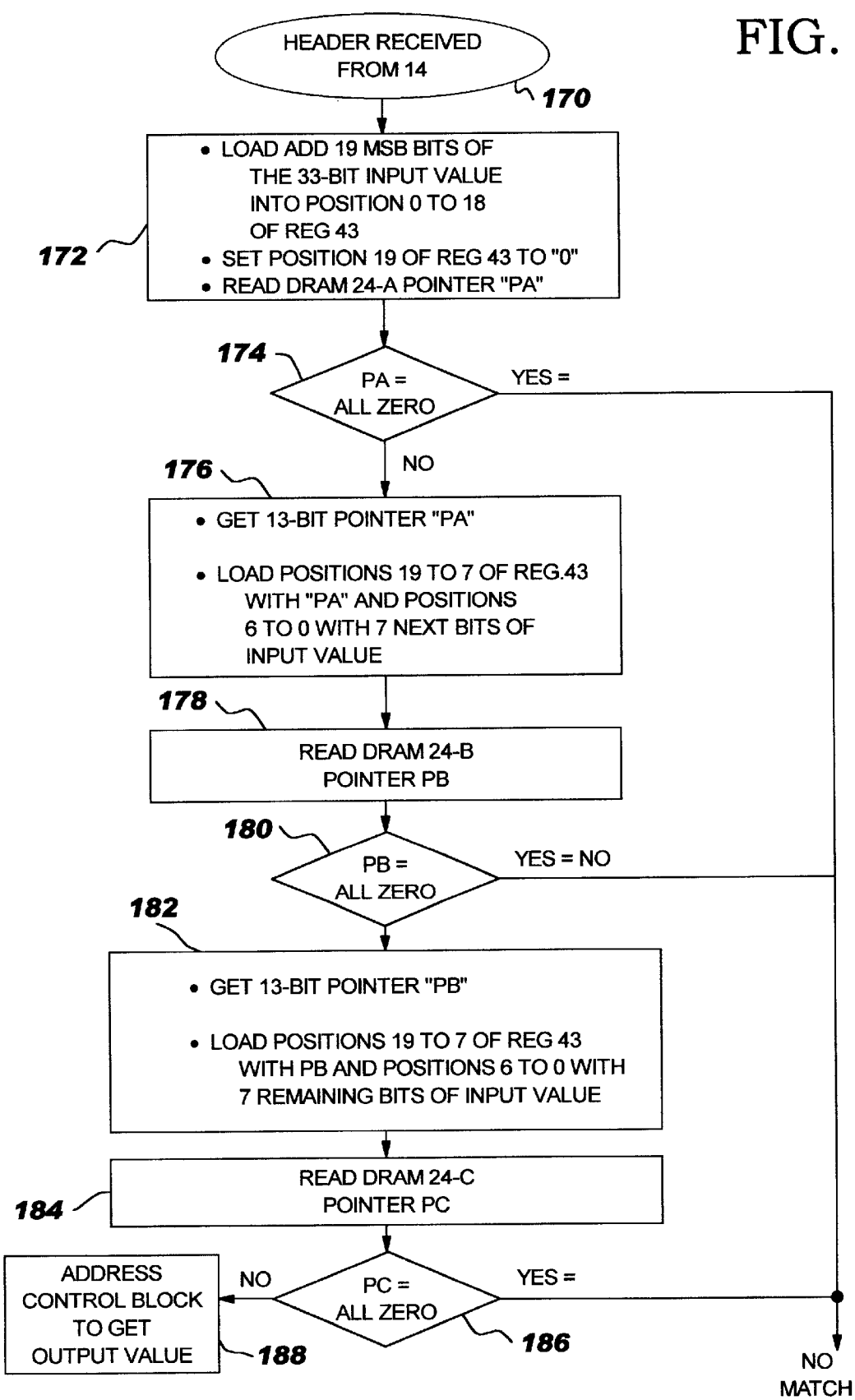
FIG. 7 represents the operations which are performed by the control logic to obtain the output value corresponding to an input value.

First a search operation is started using the 33-bit of the "yyy" entry by performing the steps 172 to 184 of FIG. 7. The pointers PA, PB and PC and their addresses in DRAM 24-A, 24-B and 24-C are saved, as shown at 192.

Then, at step 194, it is tested whether a match has been found, if NO the delete operation is ended, since this means that the entry "yyy" is not present in the pseudo content addressable memory.

If YES, the pointer PC is written on the top of stack SC at the address indicated by the contents of the up/dowm counter 92-C which is then incremented by 1. All zero's are written at the PC address saved at step 192.

Then, with pointer PB and all possible combinations of seven bits the DRAM 24-C is read, starting at PB concatenated with 0000000 as shown at step 198. The pointer PC which is returned at each reading operation is tested at step 200. If it is found different from all zero, the delete operation is ended since this means that the pointer is still in use for marking a different path. If the pointer is found equal to all zero, it is tested whether the $2^7$ read operations have been performed, at step 202. If No, the address is incremented by 1 at step 204 and a loop is entered at step 198.

If YES, all zero's are written at PB address saved at 192 and PB is written on the top of stack SB at the address indicated by the counter 92-B, which is incremented by 1.

Then, the DRAM 24-B is read with pointer PA and all possible combinations of seven bits, starting at PA concatenated with 0000000 as shown at step 208. The pointer PB which is returned at each reading operation is tested at step 210. If it is found different from all zero, the delete operation is ended since this means that the pointer is still in use for marking a different path.

If the pointer is found equal to all zero, it is tested at step 212 whether the $2^7$ read operations have been performed. If NO, the address is incremented by 1 at step 214 and a loop is entered at step 208.

If YES, all zero's are written at PA address saved at 192 and PA is written on the top of stack SA at the address indicated by the counter 92-A, which is incremented by 1.

The delete operation is thus ended as shown at 218.

In case a search operation has to be made on a part of the input value such as VP in the preferred embodiment of the invention, the search process can be ended when a match with the VP pattern of the input value has been found.

Depending upon which parts of the input value have to be searched, the search is ended at step 174, 180 or 186 of FIG. 7.

What is claimed is:

1. An apparatus for providing output values corresponding to a number E of n-bit input values, with E being an integer lower or equal to $2^p-1$, characterized in that it comprises:

a plurality of cascaded random access memories (24-A, 24-B and 24-C) having a $2^d$ addressing capability, where d is an integer higher than p, means for storing in each random access memory p-bit pointers, each one of them being different from the others and being assigned to one input value, means (40, 122 to 158) for sequentially addressing and reading at least one of the random access memories, the first one being addressed with a part including a number n1 of bits of the input value, with n1 equal or lower than d, and each one of the next memories being addressed with the pointer read from the preceding memory concatenated with a part including a number ni of bits of the input value, with ni equal to or lower than n−n1, means (40, 160) for finding the output value as a result of the addressing of the last random access memory in the sequence.

2. The apparatus according to claim 1, characterized in that the means for storing the p-bit pointers comprises:

a stack of pointers assigned to each random access memories, means (92) for storing $2^p-1$ different pointers in each stack.

3. The apparatus according to claim 2 characterized in that the means for setting the p-bit pointers comprises:

means responsive to an input value for sequentially addressing and writing the random access memories, the first memory being addressed with the n1 bits part of the input value and a pointer fetched from the pointer stack assigned to the first memory being written at the addressed location and each one of the next memories being addressed with the pointer written into the preceding memory concatenated with the ni bits parts of the input value and a pointer fetched from the pointer stack assigned to the memory being written at the addressed location.

4. The apparatus according to claim 3, characterized in that it comprises means for deleting the pointers stored into the random access memories corresponding to a n-bit input value.

5. The apparatus according to claim 4 characterized in that the means for deleting the pointers comprises:

means (40, 190 to 218) responsive to the n-bit value to be deleted for sequentially addressing the random access memories, the first one being addressed with n1 bits of the input value and the next ones being addressed with the pointer read from the preceding memory concatenated with the ni bits parts of the input value, means (40, 192) for saving the pointers sequentially read from the random access memories, means (40, 216) for writing the pointer read from the last random access memory on the top of the stack assigned to said random access memory and cancelling the pointer into the last memory addressed location, means (40, 198 to 216) for writing the pointers read from the random access memories except the last one onto the tops of the stacks assigned to the said memories and cancelling the pointers into the memory addressed locations when said pointers are not used for addressing locations corresponding to input values not to be deleted.

6. The apparatus according to any one of claims 1 to 5, characterized in that the means for finding the output value comprises:

control blocks arranged into one of said random access memory, each control block being addressable by the pointer read from the last memory and storing the output value corresponding to the input value.

7. The apparatus according to any one of claims 1 to 5 characterized in that the random access memories are dynamic random access memories.

8. The apparatus according to claim 6 characterized in that n=33, p=13.

9. The apparatus according to claim 8 characterized in that n1=20 and ni=7.

10. The apparatus according to claim 9, characterized in that the stacks and control blocks are stored in the first random access memory.

\* \* \* \* \*